United States Patent
Shim et al.

(10) Patent No.: US 8,543,811 B2
(45) Date of Patent: Sep. 24, 2013

(54) EFFICIENT IDENTITY-BASED RING SIGNATURE SCHEME WITH ANONYMITY AND SYSTEM THEREOF

(75) Inventors: Kyung Ah Shim, Gyeonggi-do (KR); Young Ran Lee, Daejeon (KR)

(73) Assignee: Institute for Basic Science, Daejeon (KR)

(*) Notice: Subject to any disclaimer, the term of this patent is extended or adjusted under 35 U.S.C. 154(b) by 18 days.

(21) Appl. No.: 13/314,665

(22) Filed: Dec. 8, 2011

(65) Prior Publication Data
US 2012/0159153 A1 Jun. 21, 2012

(30) Foreign Application Priority Data

Dec. 13, 2010 (KR) ........................ 10-2010-0127205

(51) Int. Cl.
*H04L 29/06* (2006.01)
*H04L 9/32* (2006.01)
*H04L 9/00* (2006.01)

(52) U.S. Cl.
USPC .............................. 713/155; 713/176; 380/44

(58) Field of Classification Search
USPC ........................................... 713/176; 380/44
See application file for complete search history.

(56) References Cited

U.S. PATENT DOCUMENTS 8,108,678 B1 * 1/2012 Boyen ........................... 713/176
8,180,049 B2 * 5/2012 Gentry ............................ 380/44

\* cited by examiner

*Primary Examiner* — Shin-Hon Chen
(74) *Attorney, Agent, or Firm* — Harness, Dickey & Pierce, P.L.C.

(57) ABSTRACT

An identity-based ring signature authentication method provides an efficient identity-based ring signature method, which has a constant number of bilinear pairing computations independent the number of ring members in a verification process. The method does not use a special type of function, e.g., MapToPoint.

13 Claims, 2 Drawing Sheets

FIG. 1

EFFICIENT IDENTITY-BASED RING SIGNATURE SCHEME WITH ANONYMITY AND SYSTEM THEREOF

CROSS-REFERENCE TO RELATED APPLICATION

This application claims priority under 35 U.S.C. §119(a) from Korean Patent Application No. 10-2010-127205 filed on Dec. 13, 2010, the disclosure of which is hereby incorporated by reference in its entirety.

BACKGROUND

Embodiments of the present inventive concepts relate to an identity-based ring signature scheme, and more particularly, to an efficient identity-based ring signature scheme having a constant number of bilinear pairing computations independent the number of ring members in a verification process and a system performing the method.

A ring signature is a method where a signer composes a group or a ring including him or herself and signs on an arbitrary message by using all of the user's own secret key and a public key of each of other members in the group.

The verification of ring signature may be convinced that the given signature is generated by one of members consisting the ring, but it does not reveal exactly which member of that. Accordingly, a ring signature offers anonymity.

After a concept of ring signature is first proposed by Rivest, Shamir and Tauman in 2001, various ring signature schemes are proposed.

In a public key cryptosystem, a user generally has two keys, e.g., a secret key and a public key. What connects the public key with identity of the public key owner and confirms validity of the public key is a digital signature type of public key certificate on which a certificate authority (CA). In a conventional traditional certificate-based system, each of users have computational complexity to register his public key and verify the validity of a corresponding public key all the time before using the other's public key and the conventional public key system has the issue of key management that is somewhat complex.

Since an identity-based ring signature scheme of Zhang and Kim using a bilinear pairing is proposed in 2002, a lot of identity-based ring signature schemes are proposed. However, the proposed schemes have a feature that bilinear pairing a number of pairing computation increases in proportion to the number of ring members during verification, so that it is considerably inefficient. A bilinear pairing computation on an elliptic curve needs the most time and costs in spite of development of an implementation technology and a computer.

SUMMARY

The present general inventive concept provides an efficient identity-based ring signature method, which has a constant number of pairing computation independent the number of ring members in a verification process and does not use a special type of function, e.g., MapToPoint, and a system performing the method.

An example embodiment of the present inventive concepts is directed to an identity-based ring signature method, including generating, by a private key generator, a secret key $S_t$ by using public parameters (q, $G_1$, $G_2$, e, P, $P_{pub}$, g, $H_1$, $H_2$) and identity received from a terminal of a $t^{th}$ user and transmitting the generated secret key $S_t$ to a terminal of the user, setting, by the terminal, (n−1) values ($V_1, V_2, \ldots, V_{t-1}, \ldots, V_{t+1}, \ldots, V_n$) by choosing an arbitrary random value and generating a first digital signature U on a message m by using the public parameters, the secret key $S_t$, a set (L={$ID_1, \ldots, ID_n$}) of identities of ring members including identity $ID_t$ of the user, and the (n−1) values, generating a digital signature $V_t$ of the user by using the first digital signature U, the message m, the set Ls and the secret key $S_t$, generating a plurality second digital signature including the (n−1) values used to generate the first digital signature U and the digital signature $V_t$ of the user, and generating a ring signature τ including the first digital signature U and the plurality of second digital signature, receiving, by an authentication server, the set L, the message m and the ring signature τ on the message m from the terminal and verifying validity of the received ring signature τ by using the public parameters.

The public parameters include an elliptic curve group $G_1$ and a multiplicative subgroup $G_2$ of finite fields, each of $G_1$ and $G_2$ denotes a group of prime order q, a bilinear pairing e, a generator P of the G1, a public key ($P_{pub}$=s·P) which is a scalar multiplication of the P and a master secret key s of the private key generator, a result (g=e(P, P)) of the bilinear pairing e taking as an input the generator P, a first hash function $H_1$, and a second hash function $H_2$.

The secret key $S_t$ is generated by using an output ($q_t$=$H_1(ID_t)$) of the first hash function $H_1$ taking as an input the identity $ID_t$, the master secret key s and the generator P.

The secret key $S_t$ is generated according to an equation of $$S_t = \frac{1}{s+q_t} P.$$

The first hash function $H_1$ maps to an arbitrary bit string to a point on an integer set Zq, wherein the master secret key s is a random number chosen by the private key generator, wherein $Z_q$ denotes a set of remainders after dividing integers by the prime order q.

The generating the first digital signature includes choosing (n−1) random points $V_i$ (1≦i≦n, i≠t) from the $G_1$, computing a first hash value ($q_i$=$H_1(ID_i)$) of the first hash function $H_1$ on each identity $ID_i$ wherein the $ID_i$ is an element of the set L, choosing a random number r, computing a value $g^r$, where the g is raised to a power r, a first bilinear pairing result $$e\left(\sum_{i=1,i\neq t}^{n} V_i, P_{Pub}\right)$$

with inputs an addition $$\sum_{i=1,i\neq t}^{n} V_i$$

of (n−1) random points $V_i$ and the public key $P_{pub}$, and a second bilinear pairing result $$e\left(\sum_{i=1,i\neq t}^{n} q_i V_i, P\right)$$

with inputs an addition $$\sum_{i=1, i \neq t}^{n} q_i V_i$$

of a scalar multiplication of the $V_i$ by the $q_i$ and the generator P, and generating the first digital signature U satisfying an equation of $$U = g^r \cdot e\left(\sum_{i=1, i \neq t}^{n} V_i, P_{Pub}\right) \cdot e\left(\sum_{i=1, i \neq t}^{n} q_i V_i, P\right)$$

by using the value $g^r$, the first bilinear pairing result and the second bilinear pairing result.

The digital signature $V_t$ of the user is generated according to an equation of $V_t = [r + H_2(m, U, L)]S_t$ which is a scalar multiplication of $(r + H_2(m, U, L))$ by the secret key $S_t$, wherein $(r + H_2(m, U, L))$ is an addition of the random number r and a second hash value $(h = H_2(m, U, L))$ over an integer set $Z_q$, wherein the second hash value $(h = H_2(m, U, L))$ of the second hash function $H_2$ which takes as inputs the message m, the first digital signature U and the set L.

The verifying the validity of the ring signature includes receiving the public parameters, the set L, the message m and the ring signature τ on the message m, computing the first hash value $(q_i = H_1(ID_i))$ with input an identity $ID_i$ included in the set L, computing the second hash value $(h = H_2(m, U, L))$ with inputs the message m, the first digital signature U and the set L, computing a first bilinear pairing value $$e\left(\sum_{i=1}^{n} V_i, P_{Pub}\right)$$

with inputs a value $$\sum_{i=1}^{n} V_i$$

and the public key $P_{pub}$, wherein the value $$\sum_{i=1}^{n} V_i$$

is an addition of the plurality of second digital signature, computing a second bilinear pairing value $$e\left(\sum_{i=1}^{n} q_i V_i, P\right)$$

with inputs a value $$\sum_{i=1}^{n} q_i V_i$$

and the generator P, wherein the value $$\sum_{i=1}^{n} q_i V_i$$

is an addition of a scalar multiplication of the $V_i$ by the $q_i$, computes a first output value $$e\left(\sum_{i=1}^{n} V_i, P_{Pub}\right) \cdot e\left(\sum_{i=1}^{n} q_i V_i, P\right)$$

which is a multiplication of the first bilinear pairing value and the second bilinear pairing value, computing a second output value $U \cdot g^h$ which is a multiplication of the first digital signature U and a value $g^h$, where the g is raised to a power h, and verifying the validity of the ring signature τ according to a result of comparing the first output value with the second output value, and outputting an accept signal when the first output value equals second output value and outputting a reject signal otherwise.

Here, each of $$\sum_{i=1}^{n} V_i \text{ and } \sum_{i=1}^{n} q_i V_i$$

is addition operations in the $G_1$, $$e\left(\sum_{i=1}^{n} V_i, P_{Pub}\right) \cdot e\left(\sum_{i=1}^{n} q_i V_i, P\right)$$

is a multiplication operation in the $G_2$, and $U \cdot g^h$ is a multiplication operation over the G2.

An example embodiment of the present invention is directed to a system performing an identity-based ring signature authentication method, including a private key generator, an user terminal and an authentication server.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As an example of mathematical symbols and notations, a prime denotes a natural number greater than 1 that has no divisors other than 1 and itself, $Z_q$ denotes a set of the remainders after dividing integer by a prime q, and $Z_q$ is represented by $\{0, 1, 2, \ldots, q-1\}$.

$Z_q^*$ is a set where an element '0' is excluded from the set $Z_q$ and represented by $$Z_q^* = \{1, 2, \ldots, q-1\}.$$

f: X→Y is a function from a domain X to a co-domain Y and denotes that a domain is a set of X and a co-domain is a set of Y. f(x)=y means that an element x of the set of X maps to an element y of the set of Y by a function f.

Figure 1:
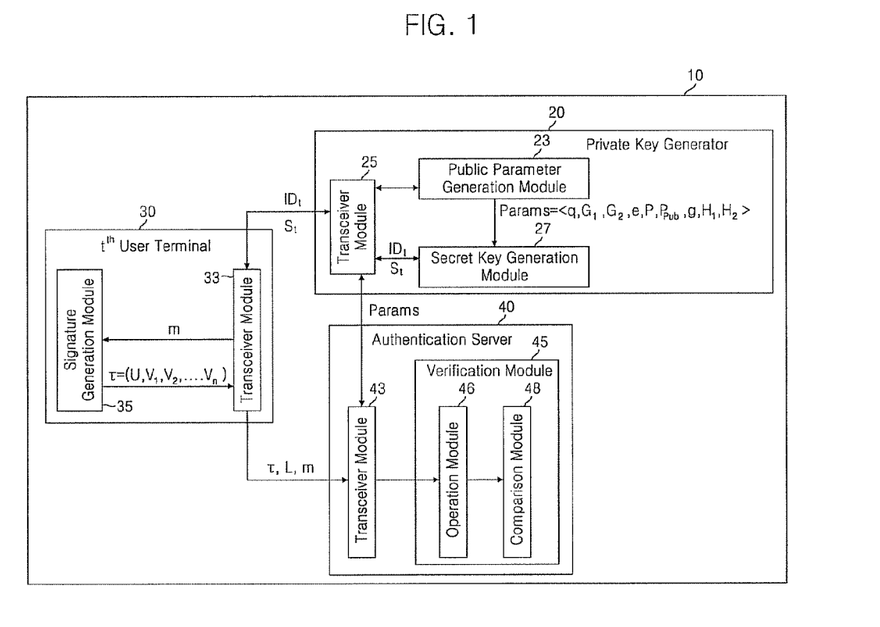
FIG. 1 is a block diagram of an identity-based ring signature authentication system according to an example embodiment of the present invention.
Figure 2:
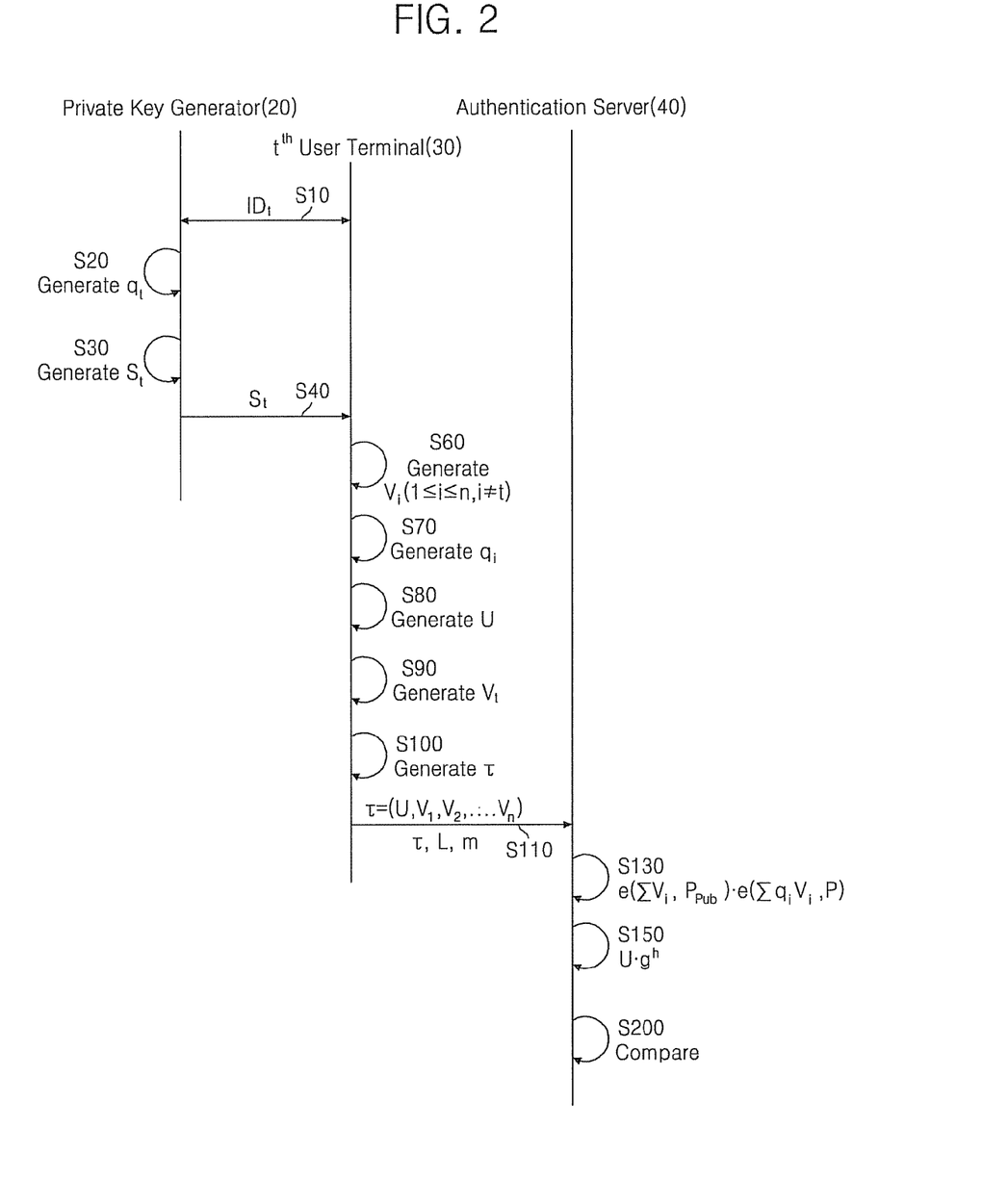
FIG. 2 is a flowchart to explain an authentication method for the identity-based ring signature authentication system illustrated in FIG. 1.

FIG. 1 is a block diagram of an identity-based ring signature authentication system according to an example embodiment of the present invention, and FIG. 2 is a data flowchart to explain an authentication method for the identity-based ring signature authentication system illustrated in FIG. 1.

Referring to FIGS. 1 and 2, the identity-based ring signature authentication system 10 includes a private key generator (PKG) 20, a $t^{th}$ user terminal 30 and an authentication server 40.

The private key generator 20 includes a public parameter generation module 23, a transceiver module 25 and a secret key generation module 27.

Each component 23, 25 and 27 of the private key generator 20 is displayed separately in a drawing to indicate that it may be separated functionally and logically; however, it does not mean that it should be a separate component or embodied in a separate code.

A module in the present invention may mean hardware which may perform a function and an operation according to each title explained in the present invention, a computer program code which may perform a specific function and operation, or an electronic recording medium, e.g., a processor, where the computer program code performing a specific function and operation is installed.

In other words, a module may mean a functional and/or a structural combination of hardware for performing a technical concept of the present invention and/or software for driving the hardware.

The public parameter generation module 23 generates a set of public parameters Params in a system setting phase.

The set of public parameters Params denote parameter values published for a user of the user terminal 30 and an authentication server 40 explained later to use them, and include each public parameter as follows.

$$\text{Params} = \langle q, G_1, G_2, e, P, P_{pub}, g, H_1, H_2 \rangle$$

The q denotes a prime, and each of the $G_1$ and $G_2$ denote a group of prime order q.

Here, the $G_1$ denotes an elliptic curve group and the $G_2$ denotes a multiplicative subgroup of a finite field.

$e: G_1 \times G_1 \rightarrow G_2$ denotes a bilinear pairing satisfying bilinearity and non-degeneracy.

The bilinearity and the non-degeneracy which the bilinear pairing e satisfies are as follows.

Bilinearity: For all Q and R which belong to $G_1$ ($Q, R \in G_1$) and all a and b which belong to Z ($a, b \in Z$), the bilinear pairing satisfies $e(aQ, bQ) = e(Q, R)^{ab}$.

Non-degeneracy: For a point $Q \in G_1$. The bilinear pairing satisfies $e(Q, Q) \neq 1$.

The P is a generator of the $G_1$ and the public key $P_{pub}$ is a public key, where a value is a scalar multiplication of the generator P and a master secret key s of the private key generator 20, i.e., $P_{pub} = s \cdot P$. That is, the public parameter generation module 23 computes $P_{pub} = s \cdot P$ by selecting an arbitrary random number $s \in Z_q^*$ and computes a result value g of a bilinear pairing e taking as an input the generator P, i.e., $g = e(P, P)$.

Here, the master secret key s is a random number selected by the private key generator 20 as secret information which the private key generator 20 only knows, and used in generating each secret key (e.g., a secret key $S_t$ of a $t^{th}$ user) of a plurality of users in a system 10.

The public key $P_{pub}$ is published to all users in the system as a public parameter; wherein it is hard to know the master secret key s satisfying the public key $P_{pub} = s \cdot P$. Such a mathematical problem is called an elliptic curve discrete logarithm problem (ECDLP) on an elliptic curve, the master secret key s is only known to the private key generator 20 which generates it, on the other hand the public key $P_{pub}$ as the public parameter is published to all users in the system.

The first hash function $H_1$ may be one of Secure Hash Algorithm (SHA)-1, SHA-224, SHA-256, SHA-384 and SHA-512, which are hash functions defined in FIPS 180-3 of ANSI, as a function $H_1$ maps an arbitrary bit string, e.g., identity of an user, to a point in an integer set $Z_q$, where $Z_q$ is the set of the remainders obtained from dividing integers by a prime order q.

The second hash function $H_2$ is a function mapping an arbitrary bit string to an element in a set $Z_q$.

According to an example embodiment, the second hash function $H_2$ may be a function defined in FIPS 180-3 of ANSI like the first hash function $H_1$.

The first hash function $H_1$ and the second hash function $H_2$ may be represented by the following mathematical equation.

$$H_1: \{0,1\}^* \rightarrow Z_q, H_2: \{0,1\}^* \rightarrow Z_q$$

The transceiver module 25 denotes hardware or software performing a function of controlling to perform radio communication with a plurality of user terminals, e.g., the user terminal 30, by using not only a wire-based communication standard but also Wi-Fi, Bluetooth or a related wireless communication standard.

The transceiver module 25 of the private key generator 20 receives identity (information) $ID_t$ from the $t^{th}$ user terminal 30 (S10).

The identity $ID_t$ of the $t^{th}$ user may include any information of distinguishing the user, such as an e-mail address of the user using the $t^{th}$ user terminal 30, a number of a mobile device and an internet protocol (IP) address.

The identity $ID_t$ is used after being converted to an arbitrary bit string.

The secret key generation module 27 generates a secret key $S_t$ by using a set of public parameters Params based on the identity $ID_t$ received from the user terminal 30 (S30).

The generation of a secret key $S_t$ which is processed by the secret key generation module 27 is as follows.

The secret key generation module 27 computes a first hash value $q_t$ by using a first hash function $H_1$, which takes as an input the identity $ID_t$ (e.g., an arbitrary string indicating identification of a $t^{th}$ user, $ID_t \in \{0,1\}$) (S20).

The first hash value: $q_t = H_1(ID_t) \in Z_q$

The secret key generation module 27 generates a secret key $S_t$ by using a master secret key s of the private key generator 20 and more specifically, the secret key $S_t$ represented by the equation 1 is the scalar multiplication of the generator P for a reciprocal of the addition of the master secret key s and the first hash value $q_t$ (S30).

$$S_t = \frac{1}{s+q_t}P \qquad \text{[Equation 1]}$$

As indicated in the equation 1, the secret key $S_t$ is generated by the private key generator 20 as a secret key of a user participating in an identity-based ring signature and denotes a secret key of a $t^{th}$ user, i.e., an $t^{th}$ user with an identity $ID_t$.

The transceiver module 23 of the private key generator 20 transmits a generated secret key $S_t$ to the terminal 30 of the $t^{th}$ user with the identity $ID_t$ through a secure channel (S40).

According to an example embodiment, the secure channel may be embodied through a secure socket layer (SSL)/transport layer security (TLS).

The SSL/TLS, as one of private information security protocols developed to overcome a problem that an internet protocol is not able to retain confidentiality in terms of security, is used widely to retain private information and credit card information security required for internet commercial transaction.

Moreover, the transceiver module 25 of the private key generator 20 transmits a set of public parameters Params to the authentication server 40.

The user terminal 30 includes a transceiver module 33 and a signature generation module 35.

The user terminal 30 denotes all communication terminals which may transmit or receive data to/from the private key generator 20 through a wire-based communication network or a wireless communication network.

According to an example embodiment, the user terminal 30 may denote a communication terminal such as a personal computer (PC), a portable computer, a tablet PC, a mobile phone, a smart phone or a personal digital assistant (PDA).

The transceiver module 33 of the user terminal 30 receives the secret key $S_t$ from the private key generator 20, and a signature generation module 35 generates a ring signature ($\tau=(U, V_1, \ldots, V_n)$) including a first part, i.e., a first digital signature U and a second part ($V_1, \ldots, V_n$), i.e., a plurality of second digital signature of the ring signature on a message m to be signed (S100).

For example, the signature generation module 35 generates an identity-based ring signature $\tau$ on a message m by using a message m to be signed, a secret key $S_t$ of the user with the identity $ID_t$, the generator P, the public key $P_{pub}$ and the second hash function $H_2$ which come from the set of the public parameter Params, where the user identity $ID_t$ is included in a set L of identities of ring members (S100).

A generation of the ring signature $\tau$ is performed as follows.

$L=\{ID_1, \ldots, ID_n\}$ indicates a set of identities of a ring members who compose the ring signature, i.e., a plurality of users. Identity of a real signer belongs to the set L of identities of ring members, and the ring signature $\tau$ is generated by a user with the identity $ID_t$, where the $ID_t$ is one of identities from the set L of users' identities composing the ring signature. Here, the $t^{th}$ identity $ID_t$ is included in the L as discrimination information of the signer generating the ring signature $\tau$.

The signature generation module 35 sets (n-1) values ($V_1, V_2, \ldots, V_{t-1}, V_{t+1}, \ldots, V_n$) by selecting an arbitrary random value and generates term U on a message m according to an equation 2 by using a set (q, $G_1$, $G_2$, e, P, $P_{pub}$, g, $H_1$, $H_2$) of public parameters Params, a secret key $S_t$, a set L of identities of ring members and the (n-1) values ($V_1, V_2, \ldots, V_{t-1}, V_{t+1}, \ldots, V_n$) (S80).

The signature generation module 35 generating a first ring signature tent, U selects (n-1) random points ($V_i \in G_1$, only i=1, 2, 3, \ldots, t-1, t+1, n) randomly in an elliptic curve group $G_1$ of prime order q, computes (n-1) first hash values ($q_i = H_1(ID_i)$) taking as an input identities $ID_i$ of ring members included in the set L (S70), chooses a random number r, computes a value $g^r$ and a first result value $$\left(e\left(\sum_{i=1,i\neq t}^{n} V_i, P_{Pub}\right)\right)$$

of bilinear pairing taking as inputs an addition $$\left(\sum_{i=1,i\neq t}^{n} V_i\right)$$

of the (n-1) random points $V_i$ and the public key $P_{pub}$ and a second result value $$\left(e\left(\sum_{i=1,i\neq t}^{n} q_i V_i, P\right)\right)$$

of bilinear pairing taking as inputs a scalar multiplication of the hash values $q_i$ and the random points $V_i$ ($1 \leq i \leq n$, $i \neq t$), and the generator P, and finally outputs the first term, i.e., a first digital signature U of ring signature according to an equation 2.

$$U = g^r \cdot e\left(\sum_{i=1,i\neq t}^{n} V_i, P_{Pub}\right) \cdot e\left(\sum_{i=1,i\neq t}^{n} q_i V_i, P\right) \qquad \text{[Equation 2]}$$

The signature generation module 35 generates the digital signature $V_t$, which is the second part of ring signature, using the previous computed value U, a message m, a list of identities of ring members, and the secret key $S_t$ (S90).

The digital signature $V_t$ of an user is generated as following steps: 1) computing the second hash value ($h=H_2(m, U, L)$) taking as inputs a message m, the first term U of ring signature, and the set L of identities of ring members, and 2) computing an addition [$r+H_2(m, U, L)$] of the random number r and the second hash value ($h=H_2(m, U, L)$) on a set $Z_q$ and the scalar multiplication of [$r+H_2(m. U, L)$] by the user secret key $S_t$ in $G_1$. That is, the signature generation module 35 generates the digital signature $V_t=[r+H_2(m. U, L)]S_t$ by using a secret key $S_t$ received from the secret key generator 20 (S90).

The $V_i(V_1, \ldots, V_{t-1}, V_{t+1}, \ldots, V_n)$ are (n-1) random values selected in $G_1$ when the first term U of ring signature.

In addition, the signature generation module 35 generates a plurality of part ($V_1, V_2, \ldots, V_{t-1}, V_t, V_{t+1}, \ldots, V_n$) of ring signature by using (n-1) values ($V_1, V_2, \ldots, V_{t-1}, V_{t+1}, \ldots, V_n$), which are used to generate the first digital signature U, and the value $V_t$ generated by the user with the identity $ID_t$ (S60).

The signature generation module 35 outputs a ring signature $\tau$ including the first digital signature U and the second part ($V_1, V_2, \ldots, V_{t-1}, V_t, V_{t+1}, \ldots, V_n$) of the ring signature (S100).

The transceiver module 33 of the user terminal 30 transmits m, L, and τ to the authentication server 30 (S110).

For convenience of explanation, FIG. 1 illustrates only a user terminal 30; however, the user terminal 30 may be multiple.

The authentication server 40 includes a transceiver module 43 and a verification module 45.

Each component of the authentication server 40 is displayed on a drawing separately to show it may be separated functionally and/or logically; however, it doesn't mean that it should be a separate component or embodied in a separate code physically.

The transceiver module 43 receives a message m, a set L of identities of ring members and a ring signature τ from the user terminal 30.

The verification module 45 of the authentication server 40 includes an operation module 46 and a comparison module 48.

The verification module 45 verifies the validity of the ring signature τ based on a message m, a set L of identities of ring members taking as inputs (m, L, τ), where $V_1, \ldots, V_n$).

The verification step for the validity of a ring signature τ is performed by the verification module 45 as follows:

The operation module 46 of the verification module 45 receiving a set of public parameters Params, a set L, and first digital signature U, performs the following steps: 1) computing two hash values $q_i = H_1(ID_i)$ and $h = H_2(m, U, L)$; 2) computing two bilinear pairings $$e_1 = e\left(\sum_{i=1}^{n} V_i, P_{Pub}\right) \text{ and } e_2 = e\left(\sum_{i=1}^{n} q_i V_i, P\right),$$

and the first output value $$e\left(\sum_{i=1}^{n} V_i, P_{Pub}\right) \cdot e\left(\sum_{i=1}^{n} q_i V_i, P\right),$$

which is a multiplication of the two values $e_1$ and $e_2$ (S130); and 3) finally outputting the second output value ($U \cdot g^h$) (S150).

Here, each of $$\sum_{i=1}^{n} V_i \text{ and } \sum_{i=1}^{n} q_i V_i$$

is an addition operation over the elliptic curve group $G_1$, the $$e\left(\sum_{i=1}^{n} V_i, P_{Pub}\right) \cdot e\left(\sum_{i=1}^{n} q_i V_i, P\right)$$

is a multiplication operation over the multiplicative subgroup $G_2$, and $U \cdot g^h$ is a multiplication operation over the multiplicative subgroup $G_2$.

The comparison module 48 verifies validity of a ring signature τ by comparing the first output value and the second output value. For example, when the first output value equals the second output value, the comparison module 48 determines that the ring signature τ is valid. For example, when the first output value equals the second output value the comparison module 48 outputs an accept signal, otherwise the comparison module 48 outputs a reject signal.

The comparison module 48 determines whether an equation 3 is satisfied as described above, and outputs whether the ring signature τ is valid or invalid according to the comparison result (S200).

$$\prod_{i=1}^{n} e(V_i, P_{pub} + q_i P) = \quad \text{[Equation 3]}$$

$$e\left(\sum_{i=1}^{n} V_i, P_{pub}\right) \cdot e\left(\sum_{i=1}^{n} q_i V_i, P\right) = U \cdot g^h$$

The above equation 3 is stated as an equation 4 in more detail.

$$e\left(\sum_{i=1}^{n} V_i, P_{pub}\right) \cdot e\left(\sum_{i=1}^{n} q_i V_i, P\right) = \quad \text{[Equation 4]}$$

$$e\left(\sum_{i=1,i\neq t}^{n} V_i, P_{pub}\right) \cdot e\left(\sum_{i=1,i\neq t}^{n} q_i V_i, P\right) \cdot e(V_t, P_{pub}) \cdot e(q_t V_t, P) =$$

$$e\left(\sum_{i=1,i\neq t}^{n} V_i, P_{pub}\right) \cdot e\left(\sum_{i=1,i\neq t}^{n} q_i V_i, P\right) \cdot e(V_t, sP) \cdot e(V_t, q_t P) =$$

$$e\left(\sum_{i=1,i\neq t}^{n} V_i, P_{pub}\right) \cdot e\left(\sum_{i=1,i\neq t}^{n} q_i V_i, P\right) \cdot e(V_t, (s+q_t)P) =$$

$$e\left(\sum_{i=1,i\neq t}^{n} V_i, P_{pub}\right) \cdot e\left(\sum_{i=1,i\neq t}^{n} q_i V_i, P\right) \cdot$$

$$e\left((r+h)\frac{1}{s+q_t}P, (s+q_t)P\right) =$$

$$g^r \cdot e\left(\sum_{i=1,i\neq t}^{n} V_i, P_{pub}\right) \cdot e\left(\sum_{i=1,i\neq t}^{n} q_i V_i, P\right) \cdot g^h = U \cdot g^h$$

It is possible that a ring signature authentication method according to an example embodiment of the present invention is embodied in a computer-readable code in a computer-readable recording medium.

A computer-readable recording medium includes all kinds of recording devices where computer system-readable data are stored. As an example of the computer-readable recording medium, there are a USB storage device, a ROM, a RAM, a CD-ROM, a magnetic tape, a hard disk, a floppy disk, and an optical data storage device. In addition, the computer-readable recording medium is dispersed to a computer system connected to network, so that a computer-readable code may be stored and performed in a disperse manner. A functional program, a code and code segments for embodying the present invention may be inferred easily by programmers in the art where the present invention belongs.

An identity-based ring signature authentication method of the present invention may vary a ring signature having a constant number of pairing computations independent of the ring members.

An identity-based ring signature authentication method of the present invention may generate a ring signature by applying not a special type of function (MapToPoint) but a general hash function and verify the generated ring signature, so that it may be applied widely.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An identity-based ring signature authentication method comprising:

generating, by a private key generator, a secret key $S_t$ by using public parameters $(q, G_1, G_2, e, P, P_{pub}, g, H_1, H_2)$ and identity $ID_t$ received from a $t^{th}$ user terminal and transmitting the generated secret key $S_t$ to the $t^{th}$ user terminal;

setting, by the terminal, (n−1) values $(V_1, V_2, \ldots, V_{t-1}, V_{t+1}, \ldots, V_n)$ by choosing an arbitrary random value and generating a first digital signature U on a message m by using the public parameters, the secret key $S_t$, a set $(L=\{ID_1, \ldots, ID_n\})$ of identities of ring members including the identity $ID_t$ of a $t^{th}$ user and the (n−1) values;

generating a digital signature $V_t$ of the $t^{th}$ user by using the first digital signature U, the message m, the set L and the secret key $S_t$;

generating, a plurality of second digital signature including the (n−1) values used to generate the first digital signature U and the digital signature $V_t$ of the $t^{th}$ user;

generating, a ring signature τ including the first digital signature U and the plurality of second digital signature; and receiving, by an authentication server, the set L, the message m and the ring signature τ on the message m from the $t^{th}$ user terminal and verifying validity of the received ring signature τ by using the public parameter, wherein the public parameters include an elliptic curve group $G_1$ and a multiplicative subgroup $G_2$ of a finite field, each of the $G_1$ and $G_2$ denotes a group of prime order q, a bilinear pairing e, a generator P of the $G_1$, a public key $P_{pub}$ (=s·P) which is a scalar multiplication of the generator P and a master secret key s of the private key generator, a result (g=e(P, P)) of the bilinear pairing e taking as an input the generator P, a first hash function $H_1$ and a second hash function $H_2$.

2. The method of claim 1, wherein the secret key $S_t$ is generated by using an output $(q_t=H_1(ID_t))$ of the first hash function $H_1$ taking as inputs the identity $ID_t$, the master secret key s and the generator P.

3. The method of claim 2, wherein the secret key $S_t$ is generated according to an equation of $$S_t = \frac{1}{s+q_t} P.$$

4. The method of claim 2, wherein the first hash function $H_1$ maps an arbitrary bit string to a point in a set $Z_q$, wherein the master secret key s is a random number chosen by the private key generator, wherein the $Z_q$ denotes a set of remainders after dividing integers by the prime order q.

5. The method of claim 1, wherein the generating the first digital signature U comprises:

choosing (n−1) random points $V_i (1 \leq i \leq n, i \neq t)$ from the $G_1$;

computing a first hash value $(q_i=H_1(ID_i))$ of the first hash function $H_1$ on each identity $ID_i$, wherein the identity $ID_i$ is an element of the set L;

choosing a random number r; and computing a value $g^r$ where the g is raised to a power r, a first bilinear pairing result $$e\left(\sum_{i=1, i \neq t}^{n} V_i, P_{Pub}\right)$$

with inputs an addition $$\sum_{i=1, i \neq t}^{n} V_i$$

of the (n−1) random points $V_i$ and the public key $P_{pub}$, and a second bilinear pairing result $$e\left(\sum_{i=1, i \neq t}^{n} q_i V_i P\right)$$

with inputs an addition $$\sum_{i=1, i \neq t}^{n} q_i V_i$$

of a scalar multiplication of the $V_i$ by the $q_i$ and the generator P, and generating the first digital signature U satisfying an equation of $$U = g^r \cdot e\left(\sum_{i=1, i \neq t}^{n} V_i, P_{Pub}\right) \cdot e\left(\sum_{i=1, i \neq t}^{n} q_i V_i, P\right)$$

by using the value $g^r$, the first bilinear pairing result and the second bilinear pairing result.

6. The method of claim 5, wherein the digital signature $V_t$ of the $t^{th}$ user is generated according to an equation of $V_t=[r+H_2(m, U, L)]S_t$ which is a scalar multiplication of $(r+H_2(m, U, L))$ by the secret key $S_t$, wherein the $(r+H_2(m, U, L))$ is an addition of the random number r and a second hash value $(h=H_2(m, U, L))$ over an integer set $Z_q$, wherein the second hash value $(h=H_2(m, U, L))$ is an output of the second hash function $H_2$ which takes as inputs the message m, the first digital signature U and the set L.

7. The method of claim 6, wherein the verifying the validity of the ring signature comprises:

receiving the public parameters, the set L, the message m and the ring signature τ on the message m;

computing the first hash value $(q_i=H_1(ID_i))$ with input identity $ID_i$ included in the set L;

computing the second hash value $(h=H_2(m, U, L))$ with inputs the message m, the first digital signature U and the set L;

computing a first bilinear pairing value $$e\left(\sum_{i=1}^{n} V_i, P_{Pub}\right)$$

with inputs a value $$\sum_{i=1}^{n} V_i$$

and the public key $P_{pub}$, wherein the value $$\sum_{i=1}^{n} V_i$$

is an addition of the plurality of second digital signature ($V_1$, ..., $V_t$, ..., $V_n$), computing a second bilinear pairing value $$e\left(\sum_{i=1}^{n} q_i V_i, P\right)$$

with inputs an value $$\sum_{i=1}^{n} q_i V_i$$

and the generator P, wherein the value $$\sum_{i=1}^{n} q_i V_i$$

is an addition of a scalar multiplication of the $V_i$ by the $q_i$, and
computing a first output value $$e\left(\sum_{i=1}^{n} V_i, P_{Pub}\right) \cdot e\left(\sum_{i=1}^{n} q_i V_i, P\right)$$

which is a multiplication of the first bilinear pairing value and the second bilinear pairing value;
computing a second output value ($U \cdot g^h$) which is a multiplication of the first digital signature U and a value $g^h$ where the g is raised to a power h; and
verifying the validity of the ring signature τ according to a result of comparing the first output value with the second output value, and outputting an accept signal when the first output value equals second output value and outputting a reject signal otherwise, wherein each of $$\sum_{i=1}^{n} V_i \text{ and } \sum_{i=1}^{n} q_i V_i$$

is an addition operation in the $G_1$,
the $$e\left(\sum_{i=1}^{n} V_i, P_{Pub}\right) \cdot e\left(\sum_{i=1}^{n} q_i V_i, P\right)$$

is a multiplication operation in the $G^2$, and the $U \cdot g_h$ is a multiplication operation over the $G_2$.

8. A non-transitory recording medium where a computer system for performing an identity-based ring signature authentication method of claim 1 is recorded.

9. An identity-based ring signature authentication system comprising:
a terminal of a $t^{th}$ user;
a private key generator for generating a secret key $S_t$ by using public parameters (q, $G_1$, $G_2$, e, P, $P_{pub}$, g, $H_1$, $H_2$) and identity $ID_t$ received from the terminal; and
an authentication server,
wherein the terminal sets (n−1) values ($V_1$, $V_2$, ..., $V_{t-1}$, $V_{+1}$, ..., $V_n$) by choosing an arbitrary random value, generates a first digital signature U on a message m by using the public parameters, the secret key $S_t$, a set (L={$ID_1$, ... $ID_n$}) of identities of ring members including the identity $ID_t$ of the user and the (n−1) values, generates a digital signature $V_t$ of the user by using the first digital signature U, the message m, the set L and the secret key $S_t$, generates a plurality of second digital signature including the (n−1) values used to generate the first digital signature U and the digital signature value $V_t$ of the user, generates a ring signature τ including the first digital signature U and the plurality of second digital signature,
wherein the authentication server receives the set L, the message m and the ring signature τ on the message from the terminal and verifies validity of the ring signature τ by using the public parameters,
wherein the public parameters include an elliptic curve group $G_1$ and a multiplicative subgroup $G_2$ of finite field, each of the $G_1$ and $G_2$ denotes a group of prime order q, a bilinear pairing e, a generator P of the $G_1$, a public key ($P_{pub}$=s·P) which is a scalar multiplication of the generator P and a master secret key s of the private key generator, a result (g=e(P, P)) of the bilinear pairing e taking as an input the generator P, a first hash function $H_1$ and a second hash function $H_2$.

10. The system of claim 9, wherein the private key generator generates the secret key $S_t$ according to $$S_t = \frac{1}{s + q_t} P,$$

wherein the $q_t$ is an output ($q_t$=$H_1$($ID_t$)) of the first hash function $H_1$ taking as an input the identity $ID_t$ of the user, who requests the private key generator to generate a secret key, as an input.

11. The system of claim 9, wherein the terminal of the user chooses (n−1) random points $V_i$ (1≤i≤n, i≠t) from the $G_1$, computes a first hash value ($q_i$=$H_1$($ID_i$)) of the first hash function $H_1$ on each identity $ID_i$, wherein the identity $ID_i$ is an element of the set L, chooses a random number r, computes a value $g^r$ where the g is raised to a power r, a first bilinear pairing result $$e\left(\sum_{i=1,i\neq t}^{n} V_i, P_{Pub}\right)$$

with inputs an addition $$\sum_{i=1,i\neq t}^{n} V_i$$

of the (n−1) random points $V_i$ and the public key $P_{pub}$, and a second bilinear pairing result $$e\left(\sum_{i=1,i\neq t}^{n} q_i V_i, P\right)$$

with inputs an addition $$\sum_{i=1,i\neq t}^{n} q_i V_i$$

of a scalar multiplication of the $V_i$ by the $q_i$ and the generator P, and generates the first digital signature U satisfying an equation of $$U = g^r \cdot e\left(\sum_{i=1,i\neq t}^{n} V_i, P_{Pub}\right) \cdot e\left(\sum_{i=1,i\neq t}^{n} q_i V_i, P\right)$$

by using the value $g^r$, the first bilinear pairing result and the second bilinear pairing result.

12. The system of claim 11, wherein the terminal of the user generates the digital signature $V_t$ of the user according to an equation of $V_t=[r+H_2(m, U, L)]S_t$ which is a scalar multiplication of $(r+H_2(m, U, L))$ by the secret key $S_t$, wherein the $(r+H_2(m, U, L))$ is an addition of the random number r and a second hash value $(h=h_2(m, U, L))$ over an integer set $Z_q$, wherein the second hash value $(h=H_2(m, U, L))$ is an output of the second hash function $H_2$ which takes as inputs the message m, the first digital signature U and the set L.

13. The system of claim 12, wherein the authentication server,
  receives the public parameters, the set L, the message m and the ring signature τ on the message m,
  computes the first hash value $(q_i=H_1(ID_i))$ with input identity $ID_i$ included in the set L,
  computes the second hash value $(h=H_2(m, U, L))$ with inputs the message m, the first digital signature U and the set L, computes a first bilinear pairing value $$e\left(\sum_{i=1}^{n} V_i, P_{Pub}\right)$$

with inputs a value $$\sum_{i=1}^{n} V_i$$

and the public key $P_{pub}$, wherein the value $$\sum_{i=1}^{n} V_i$$

is an addition of the plurality of second digital signature, computes a second bilinear pairing value $$e\left(\sum_{i=1}^{n} q_i V_i, P\right)$$

with inputs an value $$\sum_{i=1}^{n} q_i V_i$$

and the generator P, wherein the value $$\sum_{i=1}^{n} q_i V_i$$

is an addition of a scalar multiplication of the $V_i$ by the $q_i$, computes a first output value $$e\left(\sum_{i=1}^{n} V_i, P_{Pub}\right) \cdot e\left(\sum_{i=1}^{n} q_i V_i, P\right)$$

which is a multiplication of the first bilinear pairing value and the second bilinear pairing value, compute a second output value $U \cdot g^h$ which is a multiplication of the first digital signature U and a value $g^h$, where the g is raised to a power h, and verifies the validity of the ring signature τ according to a result of comparing the first output value with the second output value, and outputs an accept signal when the first output value equals second output value and outputs a reject signal otherwise,
wherein each of $$\sum_{i=1}^{n} V_i \text{ and } \sum_{i=1}^{n} q_i V_i$$

is an addition operation in the $G_1$, the $$e\left(\sum_{i=1}^{n} V_i, P_{P_{ub}}\right) \cdot e\left(\sum_{i=1}^{n} q_i V_i, P\right)$$

is a multiplication operation in the $G_2$, and the $U \cdot g^h$ is a multiplication operation over the $G_2$.

* * * * *